(12) United States Patent
Lee et al.

(10) Patent No.: US 6,253,004 B1
(45) Date of Patent: Jun. 26, 2001

(54) OPTICAL INTERCONNECTION STRUCTURE FOR ENLARGING ALIGNMENT TOLERANCE

(75) Inventors: Yong Hee Lee; Young Gu Ju; Myung Lae Lee, all of Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/350,149

(22) Filed: Jul. 9, 1999

(30) Foreign Application Priority Data

Jul. 11, 1998 (KR) .................................................. 98-28013

(51) Int. Cl.⁷ ...................................................... G02B 6/26
(52) U.S. Cl. ................... 385/31; 385/32; 385/33; 385/34; 385/36
(58) Field of Search ................... 385/31, 32, 33, 385/34, 36, 37, 39

(56) References Cited

U.S. PATENT DOCUMENTS

| | | | |
|---|---|---|---|
| 4,875,750 | 10/1989 | Spaeth et al. | ............................ 385/35 |
| 5,384,874 | * 1/1995 | Hirai et al. | ............................. 385/34 |
| 5,436,990 | 7/1995 | Head et al. | . |

\* cited by examiner

Primary Examiner—Mohammad Sikder
(74) Attorney, Agent, or Firm—Oliff & Berridge, PLC

(57) ABSTRACT

An optical interconnection structure between an optoelectric device and a single mode optical fiber for enlarging an alignment tolerance is provided. The optical interconnection structure is constituted by a microlensed optoelectric device and a graded index fiber ended single mode optical fiber. Light beams emitted from the optoelectric device are collimated by the microlens on the rear surface of a substrate or are enlarged in size by being focused or diverged. The extended output light travels a predetermined distance and then reaches the graded index fiber ended single mode optical fiber. When the length of the graded index optical fiber lens is appropriate, the incident extended beams are again focused by the lens, and thus enter into the single mode optical fiber while maintaining a great coupling efficiency. The optoelectric device and the microlens are integrated by the photolithography process, such that alignment with respect to all elements within a substrate is accomplished. Thus, there is no need to make optical alignment for each single element, resulting in the possibility of mass production. Since the graded index optical fiber lens and the single mode optical fiber have the same diameter and the same circular shape, so that they are easily aligned automatically and mechanically stable.

10 Claims, 3 Drawing Sheets

OPTICAL INTERCONNECTION STRUCTURE FOR ENLARGING ALIGNMENT TOLERANCE

BACKGROUND OF THE INVENTION

1. Field of the Invention

The present invention relates to an optical interconnection structure, and more particularly, to a structure of optical interconnection between an optoelectric device and a single mode optical fiber, for enlarging alignment tolerance.

2. Description of the Related Art

In an optoelectric device module, light transmission must be accomplished between smaller devices compared with existing electric elements. Thus, the efficiency of optical coupling between an optical source, such as a laser, and an optical fiber or optical waveguide becomes important to show the optimal performance of the optoelectric device module. The optomechanical characteristics for optimizing this optical coupling efficiency and time-consuming stabilization of thermo-mechanical characteristics are essential in determining a design, a manufacturing method, and the price of a product. Up to now, in optical connection between a single mode optical fiber and a laser diode, an edge-emitting diode laser has usually been used as the optical source. However, the edge-emitting diode laser has a laser gain medium with a thin thickness, producing an asymmetrical beam due to astigmatism, so that integration with a single mode optical fiber requires a high level of technique and a high cost. In practice, an optical fiber for single mode operation has a core diameter between 5 $\mu$m and 9 $\mu$m, and the accuracy of alignment necessary for keeping a connection loss within −3 dB is not exceeding 0.5 $\mu$m. Up to now, many attempts have been made to reduce the costs for aligning single mode optical fibers with lasers, as follows: (1) semi-automatic or automatic active alignment; (2) semi-automatic passive alignment; (3) solder reflow passive self-alignment; and (4) mechanical feature alignment. However, the above attempts are still restrictive successes. The alignment tolerance has been recently enlarged within +/−2 $\mu$m using extended beam emission from the edge-emitting diode laser, still the above alignment methods require costs at least five times higher than those for multimode module packaging.

SUMMARY OF THE INVENTION

To solve the above problems, it is an object of the present invention to provide an optical interconnection structure capable of easily connecting an optoelectric device to a single mode optical fiber in parallel while increasing an alignment tolerance.

Accordingly, to achieve the above object, there is provided an optical interconnection structure comprising: an optoelectric device for performing photoelectric conversion or optical modulation due to an electrical operation; a microlens aligned with an output aperture of the optoelectric device, for preventing the divergence of light beams output from the optoelectric device; a graded index (GRIN) multimode optical fiber of a predetermined length arranged such that light from the microlens is incident thereon; and a single mode optical fiber spliced to the GRIN multimode optical fiber.

In the present invention, a spacer for supporting the optoelectric device with a solid material that transmits light of a wavelength where the optoelectric device operates is preferably disposed between the optoelectric device and the microlens.

The optoelectric device can be an optical source selected from the group consisting of a vertical cavity surface-emitting laser, a light emitting diode, a photo diode, and a folded cavity surface-emitting laser.

The folded cavity surface emitting laser has a horizontal resonator similar to a typical edge emitting laser, but has a 45 degree deflection mirror, and is favorable to use of a long-wavelength band.

It is preferable that the spacer is a substrate, the optoelectric device is fabricated on one surface of the substrate, the microlens is fabricated on the other surface of the substrate, and the optoelectric device, the substrate and the microlens are thus incorporated into one body.

Also, in this case, an optical fiber module comprised of the GRIN multimode optical fibers and the single mode optical fibers can be a passively-aligned optical fiber array.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
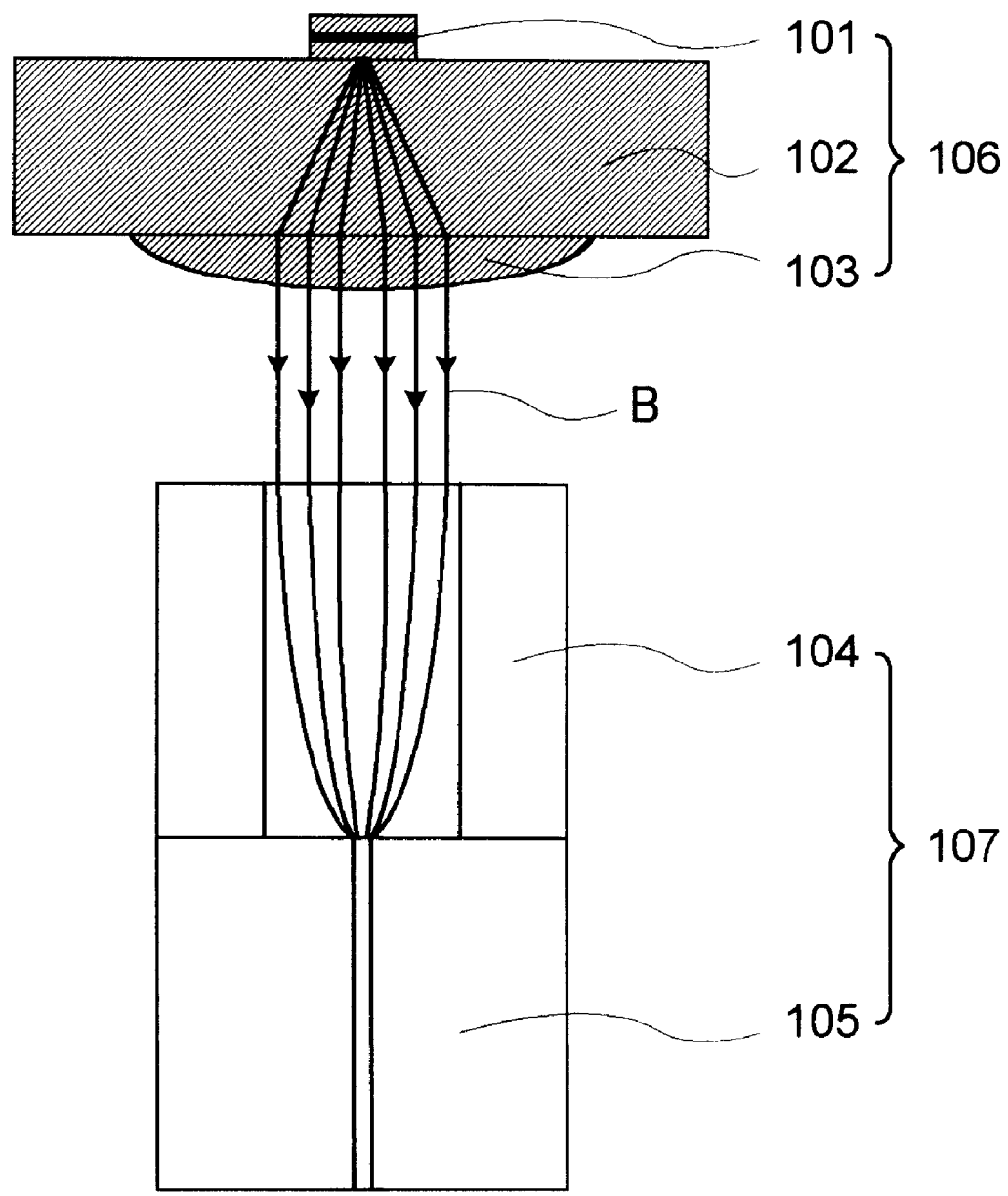
FIG. 1 is a cross-sectional view of an optical interconnection structure according to an embodiment of the present invention.

FIG. 1 is a cross-sectional view of an optical interconnection structure according to an embodiment of the present invention. Referring to FIG. 1, a vertical cavity surface emitting laser (VCSEL) 101, as an optoelectric device, is fabricated on one side surface of a gallium arsenic (GaAs) substrate 102. A microlens 103 is fabricated on the other side surface of the GaAs substrate 102. The VCSEL 101, a type of a semiconductor diode laser, has dispersion Bragg reflecting mirrors formed below and above a laser gain medium, such that the direction of the laser oscillation is vertical to the substrate 102. The geometrical feature allows two dimensional array fabrication of the VCSEL, having a low threshold current due to a reduced gain medium volume, and operating at high speed. These characteristics are very useful in making a parallel optical transmission device through two-dimensional arrangement and alignment of optical fibers. Also, the VCSEL can output light beams having a circular mode unlike existing edge-emitting diode lasers, thus the coupling efficiency to optical fibers can be more greatly increased. Instead of the VCSEL, any of planar optical sources such as a light emitting diode as well as the VCSEL can be used as the optoelectric device.

The above optical interconnection structure can be applied to an optical receiving device such as a photo diode because of the retrogression of light. Meanwhile, the small output aperture of the VCSEL 101 diffracts output beams to diverge. The microlens 103 focuses these diffracted beams or collimates them to make parallel light beams B. The microlens 103 of FIG. 1 is integrated together with the VCSEL 101 onto the substrate 102 by a semiconductor fabrication process. On virtue of this process, an optical alignment process is unnecessary, which is needed when assembling an optoelectric device and a separate microlens. Besides the GaAs microlens 103, multiple phase microlenses and refractive microlenses classified on the basis of an operation principle are made with various materials and by different manufacturing processes. Each of them is integrated and assembled together with the VCSEL, thereby forming a structure like a microlensed VCSEL 106 of FIG. 1. The parallel light beams B are incident upon a graded index fiber (GIF) ended single mode optical fiber 107. The GIF ended single mode optical fiber 107 is fabricated by splicing a graded index (GRIN) multimode optical fiber 104 and a single mode optical fiber 105 using an automatic optical fiber splicing apparatus. The GRIN multimode optical fiber 104 has been cut to have a predetermined length. Then, the cut GRIN multimode optical fiber 104 acts as a lens, so that beams are focused on the portion spliced with the single mode optical fiber 105. Therefore, the efficiency of optical coupling of the GRIN multimode optical fiber 104 to the single mode optical fiber 105 is increased. The widths of incident beams can be enlarged by appropriately adjusting the length of a GIF, and thus extended beams emitted from the microlensed VCSEL 106 can be used, and the optical alignment tolerance between the extended optical source and the optical fiber mode can be greatly increased. For example, when the output light of the VCSEL 101 having a wavelength of 0.98 $\mu$m and a fundamental mode diameter of about 3 $\mu$m passes through the 500 $\mu$m-thick substrate 102 and then the microlens 103, a parallel beam B having a diameter of about 60 $\mu$m is obtained.

Figure 2A:
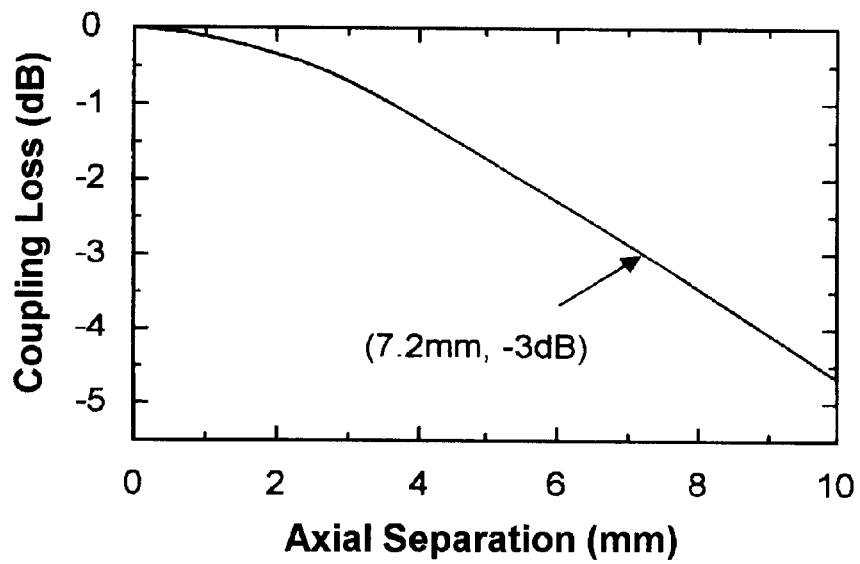
FIGS. 2A and 2B are graphs showing variations in coupling efficiency according to axial and transverse misalignments in an optical interconnection structure according to an embodiment of the present invention.
Figure 2B:
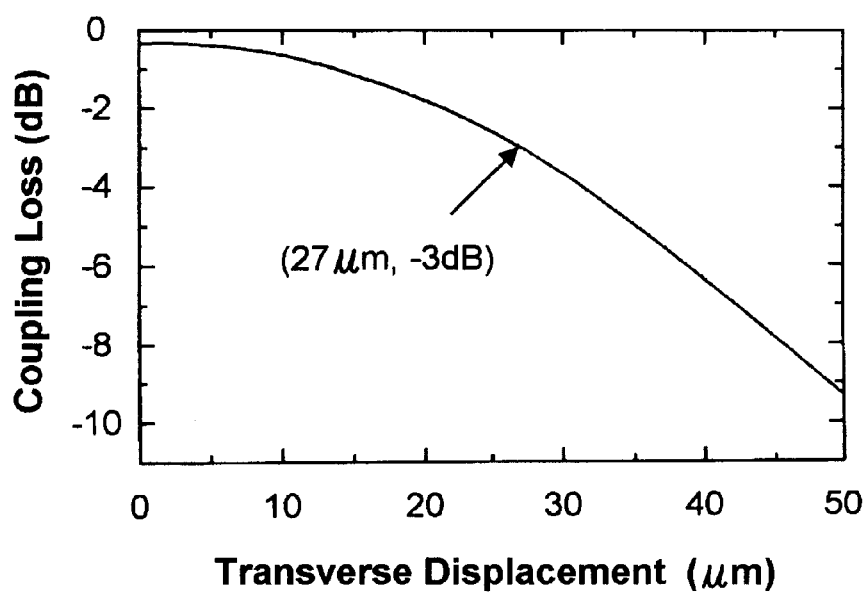

FIGS. 2A and 2B show the results of calculation of variations in coupling efficiency according to axial and transverse misalignments when the beam B is incident upon the GIF ended single mode optical fiber 107, respectively. Here, the length of the GRIN optical fiber lens obtained by the cut GRIN multimode optical fiber is 0.785 mm which corresponds to a ¼ pitch. The GRIN optical fiber lens extends the mode size of the single mode optical fiber with a diameter of 6 $\mu$m up to 70 $\mu$m. As shown in FIGS. 2A and 2B, a 3 dB alignment tolerances are axially 7.2 mm and transversely 27 $\mu$m, respectively. Use of the GRIN optical fiber lens and the microlensed VCSEL can greatly suppress a reduction of the coupling efficiency due to a transverse misalignment, through mode extension. Accordingly, an alignment tolerance is increased. This makes the assembly of the optoelectric device and the optical fiber easier, whereby the costs required for alignment can be greatly reduced.

Figure 3:
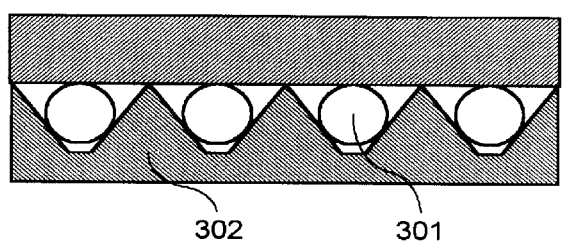
FIG. 3 is a cross-sectional view of an array of optical fibers aligned on a passive alignment optical bench.

FIG. 3 is a cross-sectional view of an array of optical fibers aligned on a passive alignment optical bench. As described above, the alignment tolerance of 10 $\mu$m or more is secured by using the microlensed VCSEL and the GIF ended single mode optical fiber, so that several GIF ended single mode optical fibers 301 can be simultaneously connected to the VCSEL array using a passive alignment optical bench 302. The passive alignment optical bench 302 shown in FIG. 3 is comprised of a plurality of silicon V grooves and the bench with an alignment tolerance of 10 $\mu$m or more can be fabricated by various methods.

Figure 4:
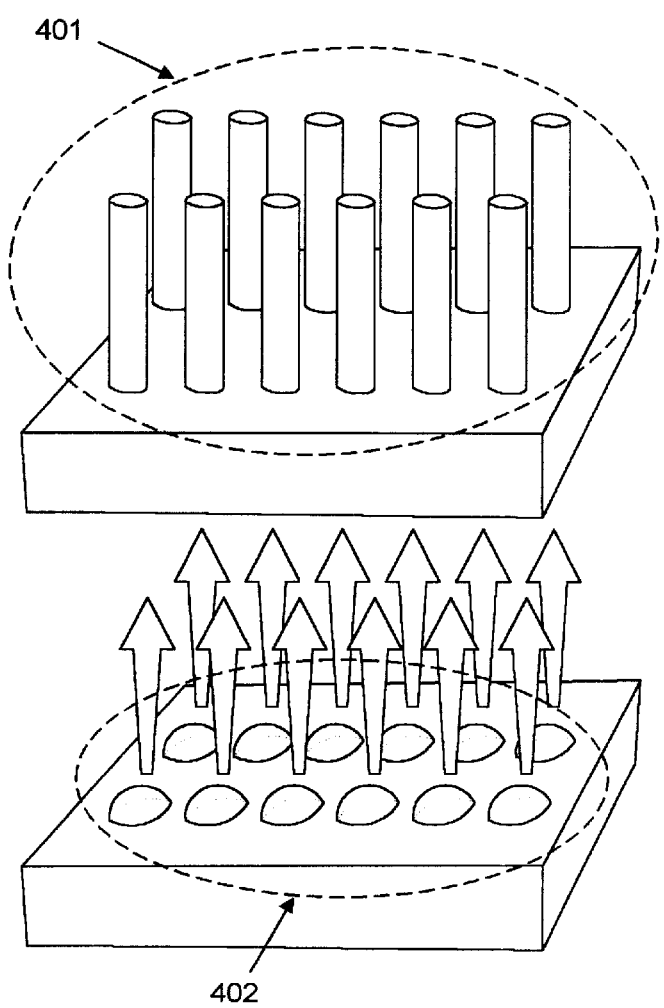
FIG. 4 is a perspective view illustrating a parallel optical interconnection structure according to an embodiment of the present invention.

Besides, a parallel optical interconnection method as shown in FIG. 4 can be realized. Referring to FIG. 4, an array 402 of microlensed VCSELs is connected in parallel to an array 401 of GIF ended single mode optical fibers. A silicon microstructure fabrication technique is used for this connection, resulting in sufficient accuracy at low costs. Also, a frame obtained by processing a plastic mold with laser can be used as the passive alignment optical bench, and any techniques having an accuracy within tolerance can be applied to the present invention in practice.

The present invention suggests solutions for an alignment problem in the field of optical element fabrication process. Despite of many current attempts, the alignment tolerance in optical connection between semiconductor lasers and single mode optical fibers was less than 1 $\mu$m. Thus, high accuracy equipment and corresponding high costs were required upon assembly. When an optical transmission/receiving module such as an optical parallel data link is produced, respective alignment processes for individual elements are required. Thus, this small alignment tolerance constitutes an obstacle to utilization in the terms of yield as well as cost. In spite of recent great improvements in alignment tolerance due to the expansion of beams from the edge-emitting lasers, the alignment tolerance remains about +/-2 $\mu$m, and the cost reaches five times of the cost required upon connection of multimode optical fibers. The present invention fundamentally solves this optical alignment problem by increasing the alignment tolerance at or over 10 $\mu$m by composite use of the integration technique of a VCSEL and a microlens and the splicing technique of a GRIN optical fiber and a single mode optical fiber. This optical connection structure greatly increases mass productivity by providing a simple fabrication method, a low cost for components, and a reduced assembly cost as well as technical innovation. Also, this structure according to the present invention is directly helpful to improvement of the optical transmission/receiving modules and can be naturally applied to the parallel optical connection technique, thus making a great contribution to long-distance optical connection techniques as well as to short-distance optical connection techniques in the field of a LAN(Local Area Network) or an ISDN(Integrated Service Digital Network).

What is claimed is:

1. An optical interconnection structure comprising:

an optoelectric device for performing photoelectric conversion;

a microlens aligned with an output aperture of the optoelectric device for preventing the divergence of light beams output from the optoelectric device;

a spacer disposed between the optoelectric device and the microlens for supporting the optoelectric device with a solid material that transmits light of a wavelength where the optoelectric device operates;

a graded index multimode optical fiber of a predetermined length arranged such that light from the microlens is incident thereon; and a single mode optical fiber spliced to the graded index multimode optical fiber.

2. The optical interconnection structure of claim 1, wherein the spacer is a substrate, the optoelectric device is fabricated on one surface of the substrate, the microlens is fabricated on the other surface of the substrate and the optoelectric device, the substrate and the microlens are thus incorporated into one body.

3. The optical interconnection structure of claim 1, wherein the optoelectric device is an optical source selected from the group consisting of a vertical cavity surface emitting laser, a light emitting diode, a photo diode, and a folded cavity surface emitting laser.

4. An optical interconnection structure comprising:
(1) a photoelectric module including,
   (a) a photoelectic element for performing photoelectric conversion or optical modulation due to an electrical operation,
   (b) a plurality of microlenses, each being aligned with each of output apertures of the optoelectric device for preventing the divergence of light beams output from the optoelectric device, and
   (c) a spacer disposed between the optoelectric device and the microlenses for supporting the optoelectric device with a solid material that transmits light of a wavelength where the optoelectric device operates; and
(2) a optical fiber module including,
   (a) graded index multimode optical fibers, each being arranged such that light from each microlens is incident thereon, and
   (b) single mode optical fibers, each being spliced to each of the graded index multimode optical fibers.

5. The optical interconnection structure of claim 4, wherein the spacer is a substrate, the optoelectric device is fabricated on one surface of the substrate, the microlenses are fabricated on the other surface of the substrate, and the optoelectric device, the substrate and the microlenses are thus incorporated into one body.

6. The optical interconnection structure of claim 4, wherein the optoelectric device is an optical source selected from the group consisting of a vertical cavity surface emitting laser, an emitting diode, a photo diode, and a folded cavity surface emitting laser.

7. The optical interconnection structure of claim 4, wherein the optical fiber module is a passively-aligned fiber array.

8. An optical interconnection structure comprising:
   an optoelectic device for performing photoelectric conversion;
   a microlens aligned with an output aperture of the optoelectric device for preventing the divergence of light beams output from the optoelectric device;
   a graded index multimode optical fiber of a predetermined length arranged such that light from the microlens is incident thereon; and
   a single mode optical fiber spliced to the graded index multimode optical fiber;
   wherein the optoelectric device is an optical source selected from the group consisting of a vertical cavity surface emitting laser, a photo diode, and a folded cavity surface emitting laser.

9. The structure of claim 8, further comprising a spacer disposed between the optoelectric device and the microlens for supporting the optoelectric device with a solid material that transmits light of a wavelength where the optoelectric device operates.

10. The optical interconnection stirructure of claim 9, wherein the spacer is a substrate, the optoelectric device is fabricated on one surface of the substrate, the microlens is fabricated on the other surface of the substrate and the optoelectric device, the substrate and microlens are thus incorporated into one body.

* * * * *